United States Patent Office 3,537,318
Patented Nov. 3, 1970

3,537,318
TRANSDUCER OVERLOAD PROTECTION MEANS
Ronald P. Helin, Camarillo, Calif., assignor to Statham Instruments, Inc., Oxnard, Calif., a corporation of California
Filed Nov. 21, 1968, Ser. No. 777,767
Int. Cl. G01i 9/04
U.S. Cl. 73—398                          3 Claims

ABSTRACT OF THE DISCLOSURE

An improved pressure transducer having a dual-action flexure device for permitting the use of a simple mechanical overload protection stop in conjunction with a force collector element whose deflection is limited to a narrow permissible deflection range, but in which the force collector mounting can move an additional distance to permit an effective action of the stop in order to reduce membrane stresses and excessive non-linearity and hysteresis and to maximize the natural frequency of the diaphragm. The diaphragm, which acts as the force collector, is rigidly connected to a diaphragm stop mounted on a movable element which can cause the mount to move responsive to the applied pressure.

BACKGROUND OF THE INVENTION

Pressure transducers commonly employ a pressure sensing element (e.g., a strain gauge) mounted on a flexible diaphragm. When the diaphragm is subjected to the pressure to be measured, the sensing element is deflected and the stress/strain characteristics created in the sensing element by such deflection are measured, indicating the pressure to which the diaphragm is subjected.

To protect the device against permanent damage to such sensing elements and the diaphragm, when the pressure transducers in which they are incorporated are accidentally subjected to excess or overload pressures, numerous types of overload protection devices have been devised. Such devices commonly take the form of mechanical stops which abut and prevent deflection of the diaphragm beyond a predetermined limit.

A simple threaded stub, mounted in the transducer housing to overlie the diaphragm, is commonly employed as the stop member. Such a stop is desirable because it is simple, adjustable, easily replaced and relatively inexpensive. However, it has not heretofore been possible to effectively employ such a stop in a pressure transducer in conjunction with a diaphragm sensing element (e.g., a strain gauge) where the maximum permissible deflection range must be kept very small to minimize nonlinearity and hysteresis errors and maximize natural frequencies. The inherent compliance or compressibility of the stub, and the small permissible deflection of the sensing element make accurate initial positioning of the stub difficult.

SUMMARY OF THE INVENTION

The transducer comprises a diaphragm member carrying a central boss and is edge-clamped to a relatively rigid mounting. The pressure-sensitive element is mounted to overlie a flexible annular portion of the diaphragm, which in a preferred embodiment integrally connects the relatively rigid inner boss and outer mounting of the diaphragm. The outer mounting of the diaphragm is connected through a second flexure which connects the rigid diaphragm mounting to the base of the transducer. The base carries a frame member by which is mounted a stop screw positioned to overlay the central boss.

In view of the foregoing, it is an object of the present invention to provide an improved pressure transducer which effectively employs a relatively simple and inexpensive overload protection stop in conjunction with a diaphragm having a relatively small permissible deflection limit.

The foregoing and other objects and advantages of the invention will be obvious to those skilled in the art when taken in the light of the following description and the accompanying drawings.

DESCRIPTION OF A PREFERRED EMBODIMENT

Figure 1:
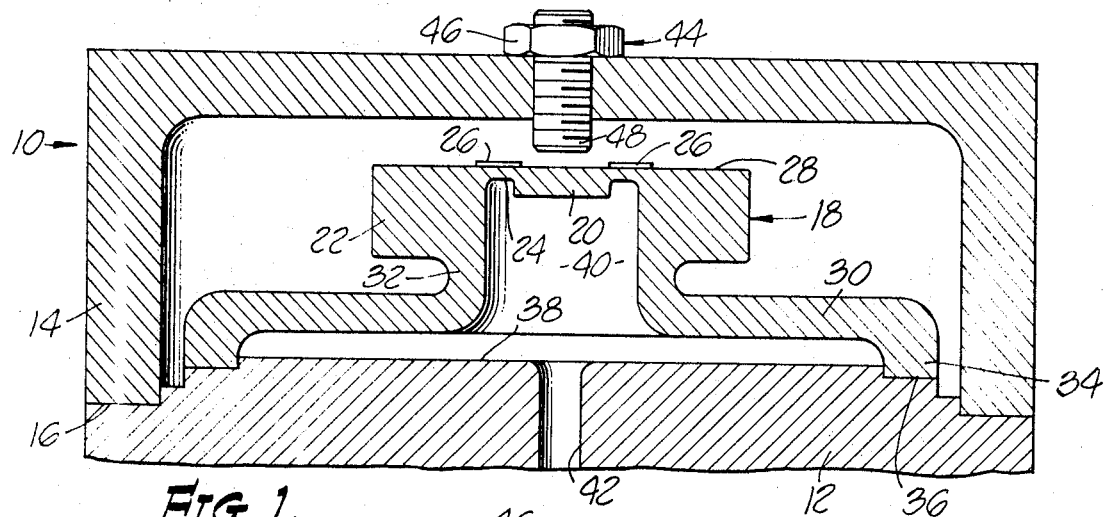
FIG. 1 is a sectional elevation view of a preferred embodiment of the improved pressure transducer of the present invention shown in its "at rest" position (i.e., prior to the application of pressure to be measured)

Referring the drawings, the improved pressure transducer 10 shown therein comprises a base member 12, having a frame member 14 in the form of a case mounted thereon. The bottom peripheral edge 16 of the cover member 14 may be welded or otherwise suitably secured to the outer peripheral portion of the base member 12. The base member 12 and the member 16 form a housing which encloses a generally disc-shaped diaphragm 18.

The diaphragm 18 comprises relatively thick, rigid inner boss 20 and outer portion 22, integrally connected to the rigid ring diaphragm mounting by a relatively thin, flexible connecting section 24, thus forming an edge-clamped diaphragm member capable of acting as a force collector. As will be understood by those skilled in this art, other suitable means of edge clamping of the rigid mount could be used. A conventional bonded strain gauge is positioned on the diaphragm 18 so as to overlie the flexible connecting section 28 thereof.

The diaphragm 18 is mounted on the base member 12 by means of a relatively flexible bell-shaped member 30. The inner peripheral edge of the bell-shaped member 30 is turned upwardly to form a flexible neck portion 32, connected to the diaphragm mounting 22; and the outer peripheral edge of the member 30 is turned downward to form a skirt portion 34, which is welded or otherwise suitable secured to the base member at 36. The diaphragm 18, the member 30, and the portion of the base member surface 38 enclosed are surrounded by the skirt 34, to define a pressure chamber 40 which communicates with a pressure passage 42 extending through the base member 12.

Mounted in the central portion of the frame member 14, so as to overlie the boss 20 of the diaphragm 18, is an adjustable stop member 44. As shown in the drawings, the stop member 44 may be of relatively simple construction, comprising a conventional nut mounted on the outer surface of the cover member and a threaded stub which may be screwed through the nut and upper surface of the frame member 14, so as to be positioned closer to or further from the diaphragm 18.

OPERATION

In operation, the pressure to be measured by the transducer 10 is connected to the pressure passage 42 in the base member by conventional means (not shown).

Figure 2:
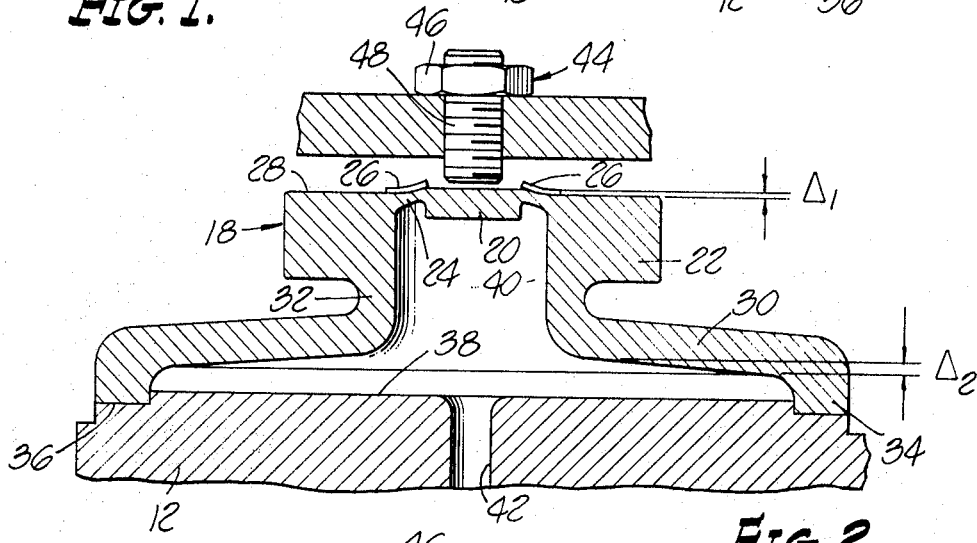
FIG. 2 is a sectional elevation view of the transducer with less than overload pressure applied thereto.
Figure 3:
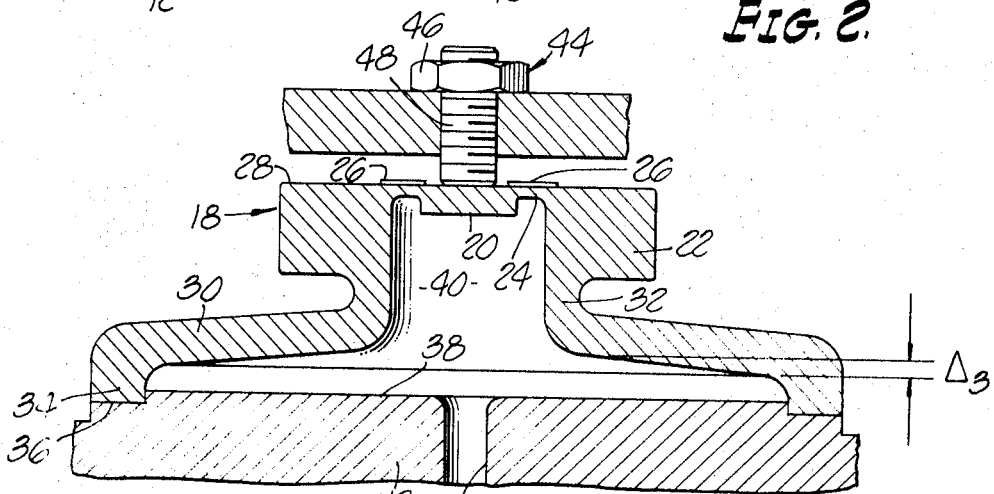
FIG. 3 is a sectional elevation view of the transducer under overload conditions.

As illustrated in FIG. 2, the pressure introduced into the pressure chamber 40 via the pressure passage 42 will cause the boss 20 to move upwardly toward the stop stub 48 relative to the diaphragm mounting 22, thereby causing the section 24 of the diaphragm and the pressure sensing element 26 mounted thereon to flex. The bonded strain gauge electrically connected into a conventional Wheatstone bridge measuring device will, as will be understood by those skilled in this art, indicate the magnitude of the deflection and therefore the applied pressure. This pressure will also cause the bellows to flex, causing upward movement of the diaphragm mounting 22 and the boss 20 toward the stop stub 48.

As shown in FIG. 2, the total displacement or upward movement of the boss 20 from its original (FIG. 1) position toward the stop stub 48 is equal to the distance, $\Delta_1$, which the boss 20 moves relative to the outer diaphragm portion 22 plus the distance, $\Delta_2$, which the boss moves relative to the base 12.

From the foregoing, it will be appreciated that the total distance, $\Delta_1$ plus $\Delta_2$, that the boss 20 moves toward the stop stub 48 with reference to the base 12 may be made to be any desired magnitude, by designing the stiffness of the member 30 to be of the desired value. As indicated in the drawing, the deflection $\Delta_2$ is made to be greater than $\Delta_1$. However, it can be made to be less than or equal to $\Delta_1$, provided that the sum of the displacements is sufficient to permit a practical application of the stop. Thus, the desired result of having a relatively small flexure in the diaphragm portion, but a relatively long distance of travel of the boss 20 toward the stop stub 48, has been achieved.

The following is stated as an illustration and not as a limitation of my invention.

Modern transducer design employing diaphragms as force collectors to which force-measuring devices are responsive require linearities in the range of 0.1%–0.2% of full scale displacement. Such displacements may be in the order of 10% or less of diaphragm thickness. In such case the maximum displacement desired is in the order of 0.0005 to 0.001 inch. Thus, for example, for a unit such as described above, operating in the range of 0–1000 to 0–5000 pounds per square inch, with a diaphragm of 0.2 square inch active area (i.e., the area subject to flexure), the total force exerted on the diaphragm is in the order of 200 to 1000 pounds. This force is exerted by the boss against the threaded stud, which may have an adjacent area of from ¼ or less of the area of the boss.

This force exerted on the stud causes a displacement of the stud due to the compliance of the metal and due to the lost motion from thread tolerances. This may be of the order of a total displacement, due to the sum of the above displacements, equal to about .001 inch; that is, equal to about the thickness of the diaphragm section undergoing flexure. This diaphragm boss could thus move a total of .001 inch before it comes up against a rigid stop.

In order to avoid this excess motion of the boss, before it reaches a solid stop, I divide the motion into two portions. I arrange the stiffness of the member 30 and the diaphragm so that, at the full load, the rigid diaphragm mount has moved, for example, .0005 inch at 1000 pounds, during which time the boss has moved a total of .0005 inch with respect to the rigid mount.

At the same time the stud 48 has moved in its threads and has compressed so that its end has moved .001 inch and has come to a rigid stop with the boss dead against it. The diaphragm has moved its allowed full scale linear displacement. The diaphragm is not overloaded, and it will not show hysteresis in its reciprocal motions as the pressure rises and falls.

Although only one specific embodiment of the present invention has been described and illustrated herein, many changes and modifications will, of course, suggest themselves to those skilled in the art. This single embodiment has been selected for this disclosure for the purpose of illustration only. The present invention should, therefore, not be limited to the embodiment so selected, the true scope of the invention being defined only in the appended claims.

I claim:
1. A pressure transducer, comprising:
    a base member including a passage communicating with a fluid pressure source;
    diaphragm means including a rigid boss, a rigid portion surrounding said boss and spaced therefrom, and a flexible member interconnecting said boss and rigid portion;
    a hollow bell-shaped member secured to the base member with its cavity lying over the passage;
    continuous wall members extending substantially normally from the bell-shaped member and affixed to the diaphragm rigid portion;
    stop means carried by the base member and including portions for engaging the diaphragm boss on pressure distention of said diaphragm means; and
    strain gauge means disposed in contact with the diaphragm flexible member.
2. A pressure transducer as in claim 1, in which the diaphragm rigid portion has peripheral margins extending outwardly of the continuous wall members.
3. A fluid pressure transducer, comprising:
    a base member including an orifice on a surface thereof in communication with a source of pressurized fluid;
    diaphragm means including a rigid boss and peripherally extending flexible walls;
    a hollow bell-shaped member affixed to said base member surface with its cavity in open communication with the orifice;
    rigid wall members integral with both said bell-shaped member and said flexible walls maintaining said diaphragm means in spaced relation to said bell-shaped member;
    stop means carried by the base member and having portions for engaging the boss upon distention of the diaphragm means to a predetermined position; and
    means in contacting relation with an outwardly directed surface of the flexible walls for producing a change in an electrical property corresponding to the degree of flexing of said flexible walls.

References Cited
UNITED STATES PATENTS 3,206,980   9/1965   Nelson _____ 73—398 XR
3,335,381   8/1967   Di Giovanni _____ 338—4

DONALD O. WOODIEL, Primary Examiner

U.S. Cl. X.R.

338—4